United States Patent

[11] 3,582,190

[72] Inventor Michael R. Smith
 Thousand Oak, Calif.
[21] Appl. No. 13,400
[22] Filed Feb. 24, 1970
[45] Patented June 1, 1971
[73] Assignee The United States of America as
 represented by the Secretary of the Navy

[54] HIGH POWER MIRROR
 9 Claims, 3 Drawing Figs.
[52] U.S. Cl..................................................... 350/310,
 350/288, 350/295, 331/94.5
[51] Int. Cl..................................................... G02b 5/08
[50] Field of Search........................................... 350/179,
 288, 293, 295, 310, 160; 340/47

[56] References Cited
 UNITED STATES PATENTS
 1,530,441 3/1925 Thomson...................... 350/310
 3,371,287 2/1968 Haddad........................ 331/94.5

*Primary Examiner*—David Schonberg
*Assistant Examiner*—Michael J. Tokar
*Attorneys*—Richard J. Miller and R. S. Sciascia ABSTRACT: A mirror capable of reflecting high incident light density without distortion and without deteriorating as a result of residual absorption of the incident energy by providing a housing with a reflecting surface in the middle and an easily evaporable liquid to act as a heat transfer device within the housing.

PATENTED JUN 1 1971  3,582,190

Michael R. Smith
INVENTOR.

BY Richard J. Miller

Attorney

HIGH POWER MIRROR

Lasers have been in the state of the art for some years and many uses have been made of them. In the process of going to higher and higher power and larger devices it has been necessary to develop mirrors that will reflect the high density of light flux without distortion. Further, there are uses that require laser beams be directed from one path to another, such guidance is accomplished by mirrors. When it is desirable to use more than one laser element in a device, the physical length of the equipment can be shortened by "folding back" the light path by using mirrors.

Mirrors as such are old in the art and the invention disclosed herein is an improvement on mirrors that makes them capable of handling very high density of light flux with minimal distortion.

It is an object of this invention to provide an improved housing member for supporting a thin mirror utilizing the above principals to prevent distortion.

It is a further object of this invention to provide a housing having means for supporting a thin mirror in a vertical plane and providing chambers on either side of the thin mirror to confine a vapor-liquid combination for transferring the heat from the mirror to the heat dissipation surface and to provide a means for equalization of the pressure across the thin mirror.

It is yet a further object of this invention to provide a mirror capable of handling high power wherein the reflecting surface is on a member prestrained and held rigidly to the housing to provide for certain forms of heat distortion.

It is still a further object of this invention to provide a mirror for reflecting high light flux densities, comprising: a hollow housing; a transparent member closing the other end of the housing; a support member disposed centrally within the housing; a thin mirror supported in a prestrained manner by the support means; and an easily evaporable liquid disposed in a chamber formed by the mirror and the first end member capable of evaporation when the mirror reflects high flux densities of light, passing to the first end member as a gas and, condensing when in contact with the first end member thereby providing a means for cooling the mirror.

Other objects, advantages and novel features of the invention will become apparent from the following detailed description of the invention when considered in conjunction with the accompanying drawings wherein.

A sufficiently thin mirror, held around the edges will remain flat when subjected to a nonuniform temperature profile and the thermal stresses induced in the mirror can be made negligibly small in the following manner.

Figure 3:
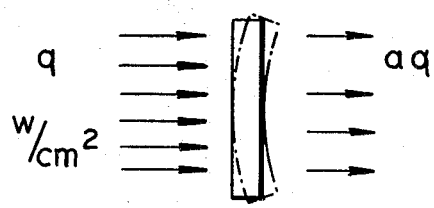
FIG. 3 is a mirror showing distortion due to heat absorption.

Consider a flat mirror of thickness $h$ with an incident light flux $q$, W/cm$^2$ on the surface as shown in FIG. 3.

Heat is assumed to be conducted from the back surface. The one-dimensional heat flow results in a linear temperature profile through the substrate given by:

$$T=T_1-T_2 \text{aqx}(agh)/k$$

where $a$ is the absorptivity and $k$ is the thermal conductivity of the substrate material.

If the plate is free to expand it will attain a spherical shape with the radius of curvature given by:

$$r=h/(\alpha \Delta T)$$

where $\alpha$ is the linear temperature expansion coefficient. Combining these two equations:

$$r=k/q a \alpha$$

notice that the distortion is independent of substrate thickness.

If the plate is held rigidly by the edges so that it is not free to expand, then a bending moment will be produced at the edges which exactly opposed the tendency of the plate to deform with the results that the plate remains perfectly flat (provided the yield strength of the substrate material is not exceeded). The generated bending moment at the plate edge produces a stress which is maximum at the edge given by:

$$\sigma = \frac{\alpha \Delta T E}{2(1-V)}$$

and $$\sigma = \frac{\alpha q a E}{2(1-V)k}h$$

where E is the modulus of elasticity of the material and $\nu$ is poissons's ratio. The stress is proportional to the plate thickness. Thereby, it is obvious that by holding the plate at the edge making the plate thin, the plate will remain flat without any significant stresses at the edge.

Expansion along the plane of the mirror will not cause distortion provided the mirror is prestrained by the edge holder. As long as the expansion in the mirror plane is less than the amount of prestrain, the mirror will remain flat.

Figure 1:
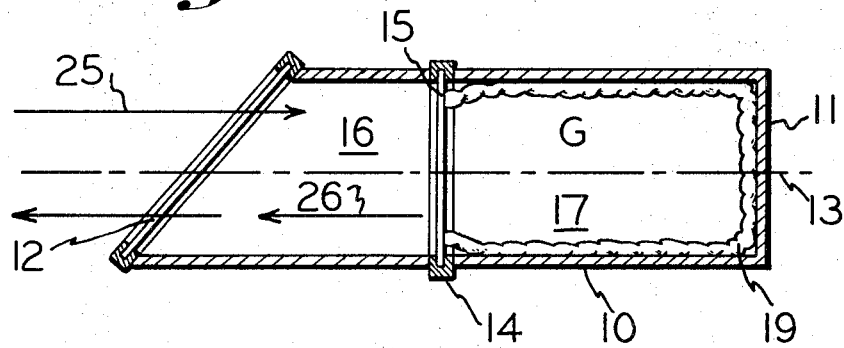
FIG. 1 is a cross-sectional view of one embodiment of the invention.

FIG. 1 shows a housing 10 having a first end 11, a second end 12, and a longitudinal axis 13. Housing 11 includes a mirror support member 14 mounting a thin film mirror 15, substantially normal to axis 11. The housing is substantially hollow and has an aperture extending throughout along the longitudinal axis.

The mirror 15 divides the housing 10 into two compartments, or enclosed portions, 16 and 17. An easily vaporized liquid 19 is shown in the portion 17. The end 12 is transparent to the radiation to be reflected and is mounted at the brewster angle so that internal reflection is minimized. A light flux 25 shown by arrows 26, back out through end 12.

When there is a high density of light flux, heat will be produced on and absorbed in the mirror 15. The liquid 19 shown in all portions of the housing, section 17, will by capillary action migrate to the mirror portion 15. The absorption of the light flux will cause the liquid to vaporize and this is designated by the presents of a gas G to indicate that the central portion of the housing 17 is filled by a gaseous state of the material. The process of vaporization absorbs heat from the back surface of mirror 15 and since the end portion 11 is a heat sink the gas will condense and the liquid migrates along the walls of portion 17 until it comes in contact with the thin mirror 15 where it is again vaporized. Since this is a continual process the mirror is cooled in this manner.

Figure 2:
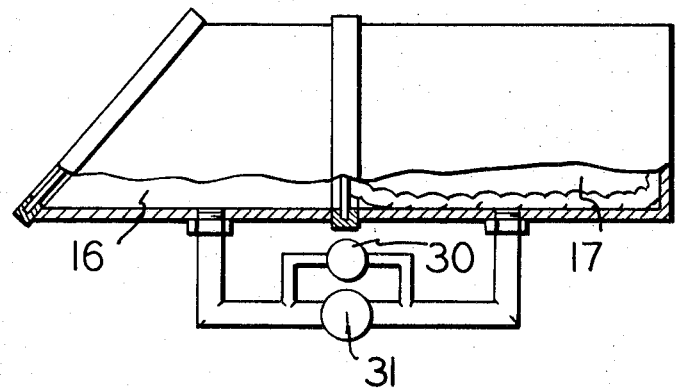
FIG. 2 is a second embodiment of the invention.

In FIG. 2 a connecting means is provided between section 16 and section 17 to equalize the pressure across the mirror so that there is not a pressure distortion. The modification of the invention shown in FIG. 2 provides a pump 30 and a valve 31 which would allow the pressures in the two sections 16 and 17 to be varied so that whatever curvature was desired could be applied to the thin mirror should this be a needed design parameter.

Obviously many modifications and variations of the present invention are possible in the light of the above teachings. It is therefore to be understood that within the scope of the appended claims the invention may be practiced otherwise than as specifically described.

I claim:

1. A mirror for reflecting high densities of light flux, comprising:
    a. a housing having first and second ends and having an aperture extending therethrough along the longitudinal axis of said housing;
    b. a mirror support member mounted to said housing in said aperture;
    c. a mirror mounted in said support member dividing said aperture in first and second portions;
    d. a first end portion affixed to said housing and defining with said housing and said mirror a first enclosed portion;
    e. a second end portion transparent to a given frequency spectrum, that is reflected by said mirror, affixed to said housing and defining with said housing and said mirror a second enclosed portion; and
    f. a material in liquid state in said first enclosed portion that is easily evaporable to a gaseous state, said material moving by capillary action across the mirror and evaporated by the heat absorbed by said mirror to said gaseous state and said gaseous state condensing when in contact with said housing and end portions of said first enclosed portion.

2. The mirror of claim 1 wherein the second end portion is mounted at the brewster angle with respect to the longitudinal axis.

3. The mirror of claim 2 wherein the mirror consists of a substrate and a reflecting surface disposed thereupon.

4. The mirror of claim 3 wherein said mirror is held in said support member in a prestrained position to eliminate certain distortions due to heat.

5. The mirror of claim 4 wherein there is provided a passage between said first enclosed portion and said second enclosed portions to allow for a equalization of pressure therebetween.

6. The mirror of claim 5 wherein is provided a means for providing a predetermined difference of pressure between said first and second enclosed portions to control the deformation of said mirror in a predetermined manner.

7. The mirror of claim 6 wherein said housing is a substantially cylindrical shape.

8. The mirror of claim 7 wherein said mirror and mirror support member have substantially circular construction.

9. The mirror of claim 8 wherein said mirror is mounted substantially normal to the longitudinal axis.